US006122989A

United States Patent [19]

Barnes et al.

[11] Patent Number: 6,122,989

[45] Date of Patent: Sep. 26, 2000

[54] PEDAL APPARATUS

[75] Inventors: Thomas Barnes, Ann Arbor; Leonard Murray Brown; Jiao J. (Peter) Huang, both of Farmington, all of Mich.

[73] Assignee: Ford Global Technologies, Inc., Dearborn, Mich.

[21] Appl. No.: 08/988,248

[22] Filed: Dec. 10, 1997

[51] Int. Cl.[7] .............................. G05G 1/14; F16B 21/18

[52] U.S. Cl. .............................. 74/512; 403/386; 411/516

[58] Field of Search .............................. 74/512, 560, 539, 74/562.5, 502.4; 403/326, 329, 384, 386, 388, 154, 155; 411/511, 516, 520, 521, 525, 526

[56] References Cited

U.S. PATENT DOCUMENTS

| | | | |
|---|---|---|---|
| Re. 30,850 | 1/1982 | Gordy et al. | 74/502.4 |
| 1,361,374 | 12/1920 | Ellison . | |
| 2,244,978 | 6/1941 | Tinnerman | 411/520 |
| 2,281,330 | 4/1942 | Sinclair . | |
| 2,424,757 | 7/1947 | Klumpp, Jr. | 74/502.4 |
| 2,430,809 | 11/1947 | Flora et al. | 74/502.4 |
| 2,761,713 | 9/1956 | Schulze . | |
| 2,869,905 | 1/1959 | Bratz | 74/502.4 |
| 2,880,641 | 4/1959 | Sislik | 411/525 |
| 3,007,726 | 11/1961 | Parkin | 411/516 |
| 3,052,130 | 9/1962 | Kellogg et al. . | |
| 4,672,860 | 6/1987 | Parker . | |
| 4,697,948 | 10/1987 | Fukuda | 403/155 |
| 4,944,644 | 7/1990 | Bell . | |

FOREIGN PATENT DOCUMENTS

| | | | |
|---|---|---|---|
| 0879636 | 3/1943 | France | 411/521 |
| 566446 | 5/1944 | United Kingdom . | |
| 981764 | 4/1963 | United Kingdom . | |
| 2-030-635 | 9/1978 | United Kingdom . | |
| 2051317 | 1/1981 | United Kingdom . | |

*Primary Examiner*—David A. Bucci
*Assistant Examiner*—Chong H. Kim

[57] ABSTRACT

A pedal apparatus provides quick and secure assembly of a pedal lever and an interconnecting mechanism. The pedal apparatus includes the pedal lever (18) and a fixed end (32) of a cylindrical member (30) is attached to the pedal lever. An interconnecting mechanism (40) is disposed between the device to be actuated by the operators efforts on the pedal lever and has a first end attached the cylindrical member. A snap lock (50) is provided having a body portion (52) disposed adjacent to a free end of the cylindrical member. The snap lock also includes at least one retaining leg (54) projecting outward from the body portion toward the pedal lever. The retaining leg has a predetermined length and width to allow installation of the first end of the interconnecting mechanism onto the cylindrical member and retention thereafter of the first end of the interconnecting means between a tip of the retaining leg and the pedal lever.

11 Claims, 1 Drawing Sheet

PEDAL APPARATUS

BACKGROUND OF THE INVENTION

1. Field of the Invention

The present invention relates generally to control devices for motor vehicles. More particularly the pedal apparatus provides an improved attachment of a pedal lever to a push rod.

2. Disclosure Information

In the conventional motor vehicle, pedals are provided for controlling the brakes and engine throttle. If the vehicle has a manual transmission, then a clutch pedal may also be provided. These pedal controls are operated by the vehicle operator. In essence, the pedal assembly transfers an operator's input to a particular device to be controlled through and interconnecting mechanism, such as a push rod, cable, etc.

Traditional pedal assemblies incorporate a cotter pin or some equivalent for securing the Interconnecting mechanism to a pedal lever. During assembly of the vehicle, the pedal lever and interconnecting mechanism are attached to one another under the dash, in a relatively confined area. Once the components are assembled, the cotter pin or equivalent is installed to keep the assembly together. This final assembly step can be very difficult, as the operator must either find the hole for the cotter pin visually or by feeling for it. Either way results in a very inefficient manufacturing process.

It would be desirable to overcome the aforenoted difficulties with previous pedal assemblies used in motor vehicles by providing a simple, low cost pedal apparatus allowing for blind, secure assembly of the pedal lever to an interconnecting mechanism.

SUMMARY OF THE INVENTION

Therefore, the present invention provides an improvement over conventional pedal assemblies by providing an attachment for a pedal lever and an interconnecting mechanism that can be assembled quickly and securely.

In accordance with the present invention, a pedal apparatus for actuating a device within a vehicle includes a pedal lever having a pedal pad disposed on a first end and a second end pivotally connected to a ground point. A fixed end of a cylindrical member is attached to the pedal lever between the first and second ends. The cylindrical member also includes a free end opposite the from the fixed end.

The pedal apparatus also includes an interconnecting mechanism, such as a push rod, for transferring operating efforts from the pedal lever to the device, such as a brake master cylinder or booster. The interconnecting mechanism includes a first end pivotally disposed on the cylindrical member. A snap lock is provided having a body portion disposed on the cylindrical member adjacent to its free end. The snap lock also includes at least one retaining leg projecting outward from the body portion toward the pedal lever. The retaining leg has a predetermined length and width to allow installation of the first end of the interconnecting mechanism onto the cylindrical member and retention thereafter of the first end of the interconnecting means between a tip of the retaining leg and the pedal lever.

It is an advantage of the present invention to provide a simple, low cost pedal apparatus capable of being assembled in a quick, secure and efficient manner.

DETAILED DESCRIPTION OF THE PREFERRED EMBODIMENTS

Figure 1:
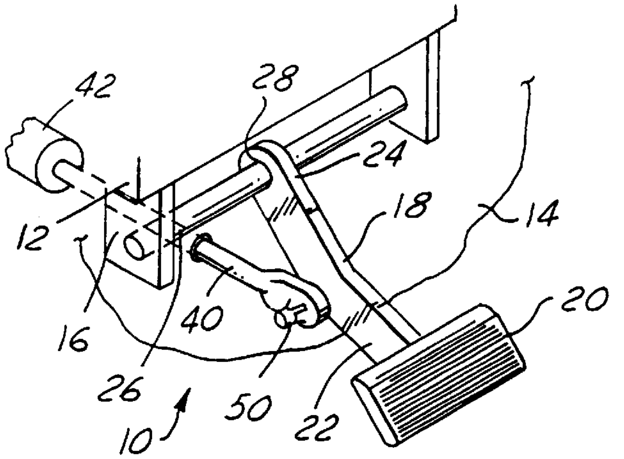
FIG. 1 is a perspective view of a pedal assembly for a motor vehicle constructed in accordance with the present invention.
Figure 2:
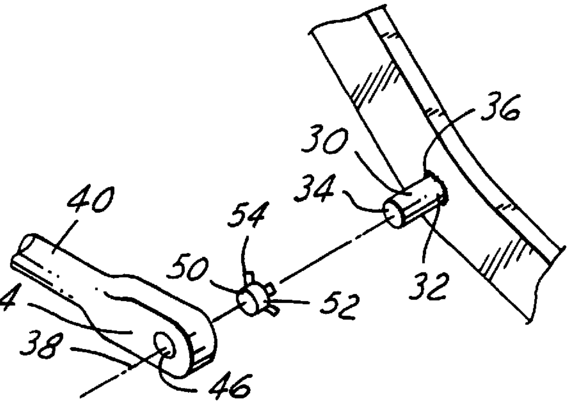
FIG. 2 is an exploded perspective view of an pedal assembly for a motor vehicle constructed in accordance with the present invention.

Referring now to FIGS. 1 and 2, the pedal assembly 10 is shown installed in a motor vehicle. The vehicle includes a dash panel 12, which extends downward to a portion of a floor member 14, and a pedal support structure 16, which may be constructed from crossbars integrated with an instrument panel and steering column support structure.

A pedal lever 18 includes a pad 20 at its first end 22 and a second end 24 that is pivotally connected to a cross link 26, which depends from the stationary pedal support structure 16 thereby creating a ground point 28 about which the pedal lever rotates within a plane transverse to the axis of the cross link 26.

A cylindrical member 30 includes a fixed end 32 attached to a pedal lever at a predetermined distance along the pedal lever between the first and second ends of the pedal lever. The positioning of the cylindrical member 30 determines the mechanical advantage for the pedal apparatus and as such, is a design variable. The Cylindrical member 30 also includes a free end 34 opposite from the fixed end 32.

In the preferred embodiment, the cylindrical member 30 is be press fit into an aperture 36 such that a transverse axis 38 of the cylindrical member is substantially perpendicular to the pedal lever 18. If additional retention is required, commonly known process such as welding, bonding, and staking may be used, as well as others having the ability to increase the retention of the cylindrical member in the pedal lever aperture.

An interconnecting mechanism 40 attaches to the cylindrical member 30 and transfers operator input efforts from the pedal lever to a device 42, which in Preferred embodiment consists of a push rod driving a master cylinder of a brake system. It should be recognized by those skilled in the art that the interconnecting mechanism may comprise other known devices, such as a cable and cable housing link members of a complex linkage.

The interconnecting mechanism includes a first end 44 pivotally disposed on the cylindrical member 30. The first end 44 includes an aperture 46 having an internal bore diameter that is sufficiently larger than an outer diameter of the cylindrical member 30 to allow relative rotation therebetween. However, to prevent undesirable operating noises and pedal free play, the relationship between these two diameters must be carefully chosen.

Figure 3:
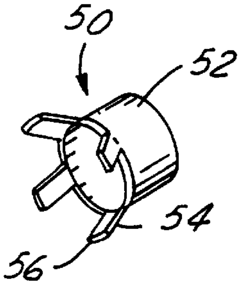
FIG. 3 is a side perspective view of a snap lock for use in a pedal assembly constructed in accordance with the present invention.
Figure 4:
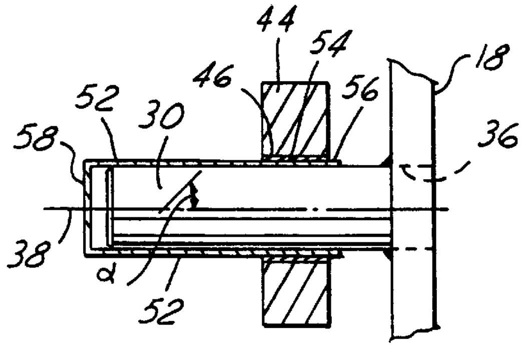
FIG. 4 is an elevational view of one embodiment of a pedal assembly constructed in accordance with the Present invention.

A snap lock 50 includes a body portion 52 that is pressed onto the free end 34 of the cylindrical member 30. Referring now to FIGS. 2 through 4, the snap lock also includes at least one retaining leg 54 projecting radially outward from the body portion 52 toward said pedal lever 18, thereby forming a predetermined angle α with the axis 38. The preferred embodiment includes a plurality of retaining legs. The retaining leg 54 extends a predetermined width length and terminates at a tip 56. A shoulder member 58 extends radially inward from the body portion 52 opposite from the retaining leg 54.

The body portion 52 of the snap lock has an inner diameter sized relative to the outer diameter of the free end of the cylindrical member to create an predetermined interference fit therebetween. The degree of interference is a design choice dependent on the amount of retention desired, available installation force, and the snap lock material.

Figure 5:
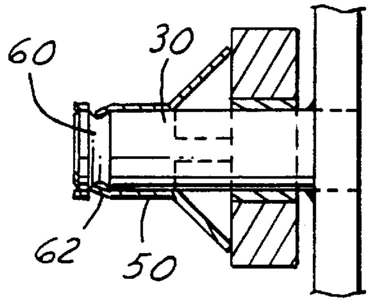
FIG. 5 is an elevational view of one embodiment of a pedal assembly constructed in accordance with the present invention.

Referring now to FIG. 5, an alternative or cumulative form of retention is shown. In this embodiment, the free end of the cylindrical member includes a groove 60 circumferentially cut, ground or rolled onto the outer surface of the cylindrical member. A mating barb 62, or preferably a plurality of barbs, protrude radially inwardly from the body portion of the snap lock to engage the groove 60, thereby positive locating the snap lock on the cylindrical member.

Figure 6:
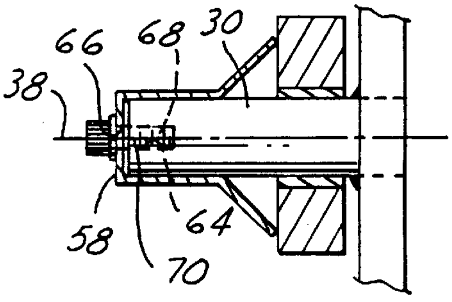
FIG. 6 is an elevational view of one embodiment of a pedal assembly constructed in accordance with the present invention.

Referring now to FIG. 6, yet another or further cumulative form of retention is shown. In this embodiment, the free end of the cylindrical member includes a threaded bore 64 axially aligned with the longitudinal axis 38 of the cylindrical member. The shoulder member 58 of the snap lock includes a snap lock aperture 66 coaxial with the threaded bore. A threaded portion 68 of a fastener 70 extends through the snap lock aperture 66 and matingly engages the threaded bore 64. A head portion 72 of the fastener 70 has a larger diameter than the snap lock aperture, thereby positively retaining the snap lock on the cylindrical member.

Assembly of the pedal apparatus, specifically the attachment of the interconnecting mechanism to the pedal lever, will now be described. Advantageously, the snap lock of the present invention is pressed onto the free end of the cylindrical member prior to installing the pedal lever into the passenger compartment, assuring a highly repeatable quality installation. The pedal assembly is then installed in the vehicle and the interconnecting mechanism is installed into the vehicle in the normal course.

The interconnecting mechanism and pedal lever can be simply and quickly be attached by manually grasping the first end of the interconnecting mechanism and forcing the aperture therein over the snap lock on the cylindrical member, compressing the retaining legs until the aperture in first end is sufficiently past the snap lock to allow the tips of the retaining legs to snap out. No further action by the operator is required, as the first end will be retained thereafter between the tip of retaining leg and the pedal lever. Yet another advantage of the present invention rests in the fact that the angle, α, of the retaining legs and their resilience is such that if the operator fails to complete the installation properly, the first end will be urged off of the cylindrical member, thereby preventing incomplete assembly of the components.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A pedal apparatus for actuating a device within a vehicle, said pedal apparatus comprising:

a pedal lever having a pedal pad disposed on a first end and a second end pivotally connected to a ground point;

a cylindrical member having a fixed end attached to said pedal lever between said first and second ends and a free end opposite said fixed end;

an interconnecting means for transferring operating efforts from said pedal lever to the device, said interconnecting means having a first end pivotally disposed on said cylindrical member; and a snap lock having a body portion disposed on said cylindrical member adjacent to said free end and retaining leg means projecting outward from said body portion and sized to allow said retaining leg means to collapse during installation of said cylindrical member onto said interconnecting means and to snap out from said collapsed position upon complete installation of said cylindrical member relative to said interconnecting means, said retaining leg means maintaining said cylindrical member installed onto said interconnecting means thereafter.

2. A pedal apparatus according to claim 1, wherein said cylindrical member extends substantially perpendicular to said pedal lever.

3. A pedal apparatus according to claim 1, wherein said first end of said interconnecting means comprises an aperture having a bore diameter sufficiently larger than a diameter of said cylindrical member to permit relative rotation therebetween.

4. A pedal apparatus according to claim 1, wherein said retaining leg means comprises a plurality of retaining legs projecting outward from said body portion toward said pedal lever, said plurality of retaining legs having a predetermined length and width so as to allow installation of said first end of said interconnecting means over said snap lock onto said cylindrical member and retention thereafter of said first end of said interconnecting means between a plurality of tips of said plurality of retaining legs and said pedal lever.

5. A pedal apparatus according to claim 1, wherein said body portion of said snap lock has an inner diameter sized relative to an outer diameter of said free end of said cylindrical member so as to create an interference fit for positively retaining said snap lock on said cylindrical member.

6. A pedal apparatus according to claim 5, wherein said snap lock further comprises a shoulder member on said snap lock opposite said at least one retaining leg so as to engage said free end of said cylinder member thereby controlling an installation depth of said snap lock onto said cylindrical member.

7. A pedal apparatus for actuating a device within a vehicle, said pedal apparatus comprising:

a pedal lever having a pedal pad disposed on a first end and a second end pivotally connected to a ground point;

a cylindrical member having a fixed end attached to said pedal lever between said first and second ends and a free end opposite said fixed end;

a push rod having a first end attached to the device and a first end pivotally disposed on said cylindrical member; and a snap lock having a body portion disposed on said cylindrical member adjacent to said free end and retaining leg means projecting outward from said body portion and sized to allow said retaining leg means to collapse during installation of said cylindrical member onto an interconnecting means and to snap out from said collapsed position upon complete installation of said cylindrical member relative to said interconnecting means, said retaining leg means maintaining said cylindrical member installed onto said interconnecting means thereafter.

8. A pedal apparatus according to claim 7, wherein said cylindrical member extends substantially perpendicular to said pedal lever.

9. A pedal apparatus according to claim 7, wherein said first end of said push rod comprises an aperture having a bore diameter sufficiently larger than a diameter of said cylindrical member to permit relative rotation therebetween.

10. A pedal apparatus according to claim 7, wherein said body portion of said snap lock has an inner diameter sized relative to an outer diameter of said free end of said cylindrical member so as to create an interference fit for positively retaining said snap lock on said cylindrical member.

11. A pedal apparatus according to claim 10, wherein said snap lock further comprises a shoulder member on said snap lock opposite said at least one retaining leg so as to engage said free end or said cylinder member thereby controlling an installation depth of said snap lock onto said cylindrical member.

* * * * *